W. GROAT.

Wooden Mats.

No. 6,186. Reissued Dec. 22, 1874.

Witnesses
K. Newell
James A. Hunter

Inventor
Warner Groat

THE GRAPHIC CO. PHOTO-LITH. 39 & 41 PARK PLACE, N.Y.

UNITED STATES PATENT OFFICE.

WARNER GROAT, OF GREEN ISLAND, NEW YORK.

IMPROVEMENT IN WOODEN MATS.

Specification forming part of Letters Patent No. 55,489, dated June 12, 1866; reissue No. 6,186, dated December 22, 1874; application filed June 3, 1874.

*To all whom it may concern:*

Be it known that I, WARNER GROAT, of Green Island, New York, have invented certain new and useful Improvements in Supplemental Flooring for Railway-Cars and other Purposes; and do hereby declare that the following is a full, clear, and exact description of the same, reference being had to the accompanying drawings forming part of this specification.

My invention consists of a wooden mat for railroad-cars and other purposes, constructed of a series of slats, each one being independent of the other, and each separated or spaced from its adjacent one by interposed washers. It also consists in beveling those edges of said slats that form the surface on which the passengers walk.

The object of this invention is to furnish a supplemental flooring for railway-cars, stages, and other purposes, which shall be wholly composed of slats arranged parallel to each other, and separated or spaced by washers, so that said slats shall rest immediately upon the main flooring of the car in a solid manner, and present on the upper or surface on which the passengers walk spaces through which dirt, water, &c., may freely pass and lodge on the main floor out of view. These slats being separated or spaced by washers only, there is practically no extended top surface left between them on which dirt or unpleasant substances to the sight may lodge.

The edges of the surface of the slats on which the passengers walk may be beveled, rounded off, or otherwise reduced in size, so as to facilitate the passing down to the bottom of the spaces or main floor of dirt, &c.

Either face may be used for passengers to walk on, thus admitting of the series being varied, as occasion requires it.

These slats and washers so arranged to each other may be connected together by any convenient and suitable means—for instance, by those shown in the accompanying drawings.

I do not limit myself to the particular means shown, as any one of several ordinary and well-known means of attaching the parts may be employed without departing from the spirit of my invention.

Figure 1:
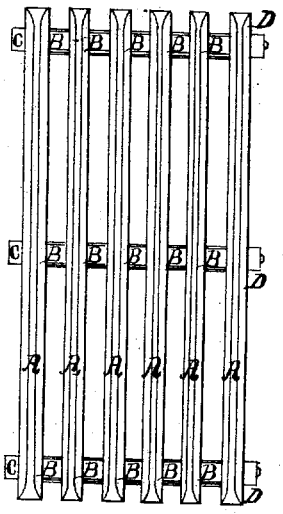
Figure 2:
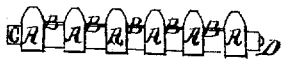

In these drawings, Figure 1 is a plan or top view of a supplemental flooring embodying the principle of my invention. Fig. 2 is an end view of such a flooring.

A A, &c., represent the slats placed parallel to each other, with their top and bottom surfaces situated, respectively, in the same plane. B B &c., are washers placed between the said slats, so arranged at suitable distances apart. In the present instance one series is placed in a line across the slats a short distance within one of the ends, and another series similarly arranged within the other or opposite end of the flooring, while a third series is placed across the center of the whole body of slats. If the slats are very long these cross-lines of washers may be proportionally increased.

In the present instance these slats and washers are retained together by means of through-bolts or rods C C, &c, with nuts D D, &c., placed on the ends of said bolts for the purpose of tightening up said slats and the interposed washers.

I claim—

1. A wooden mat constructed and spaced substantially as described.

2. A wooden mat constructed and spaced, and with the upper edges of the slats beveled, substantially as described.

WARNER GROAT.

Witnesses:
K. NEWELL,
SAM. TRO. SMITH.